Figure 2:
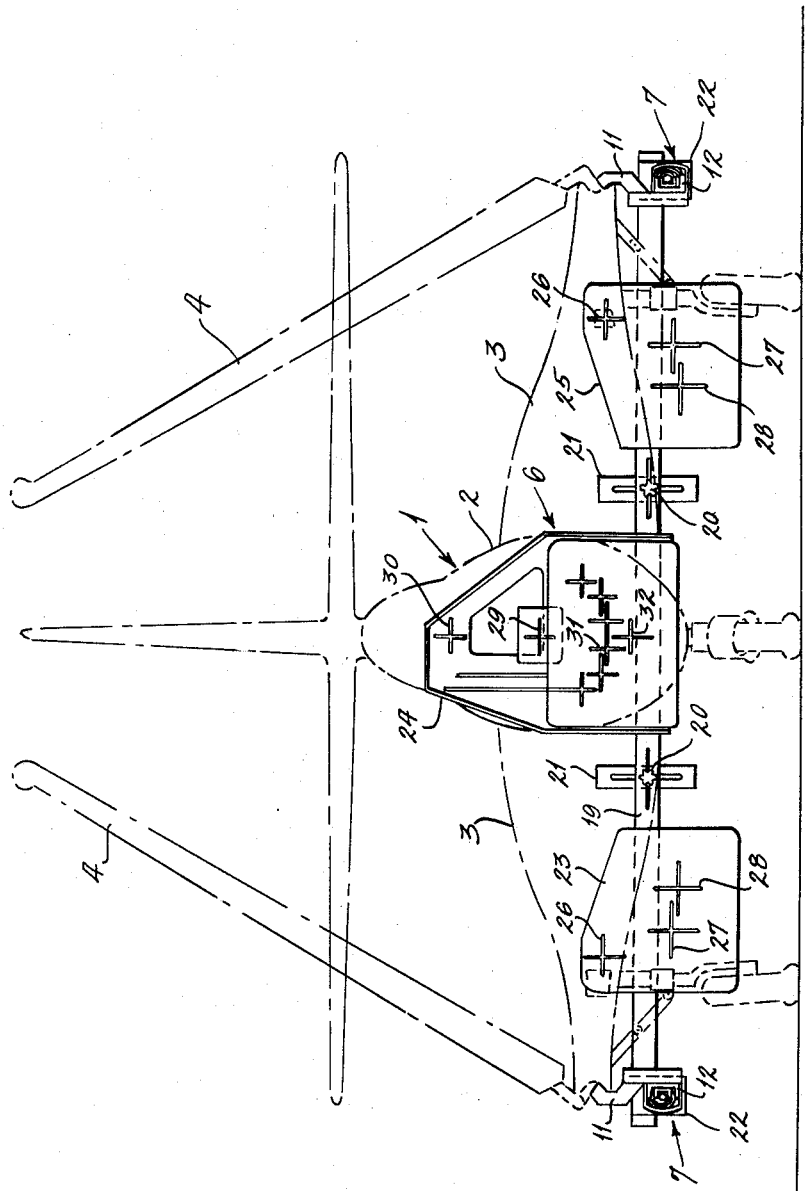

Nov. 26, 1957  A. F. HARTWIG  2,814,125
DEVICE AND METHOD FOR PROPER ALIGNMENT OF
ARMAMENT TO FLIGHT PATH OF AIRCRAFT
Filed Aug. 8, 1952  3 Sheets-Sheet 1
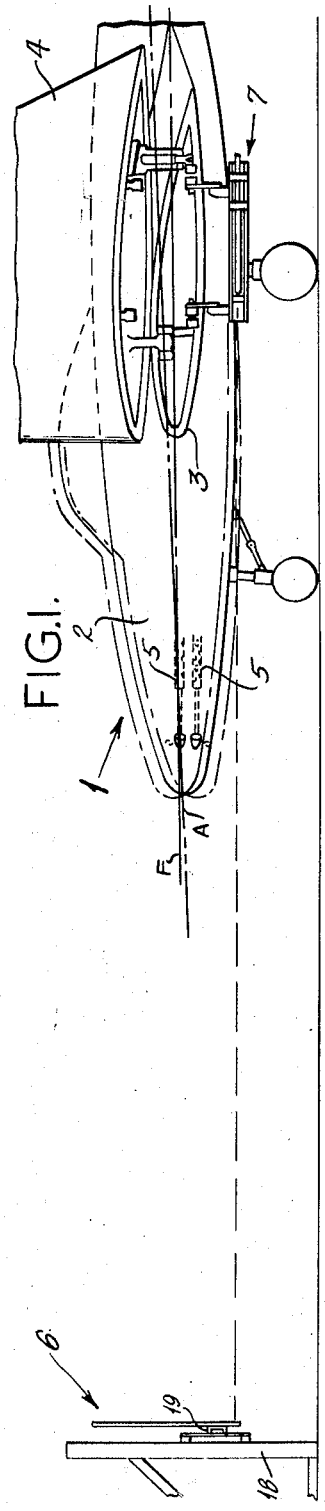
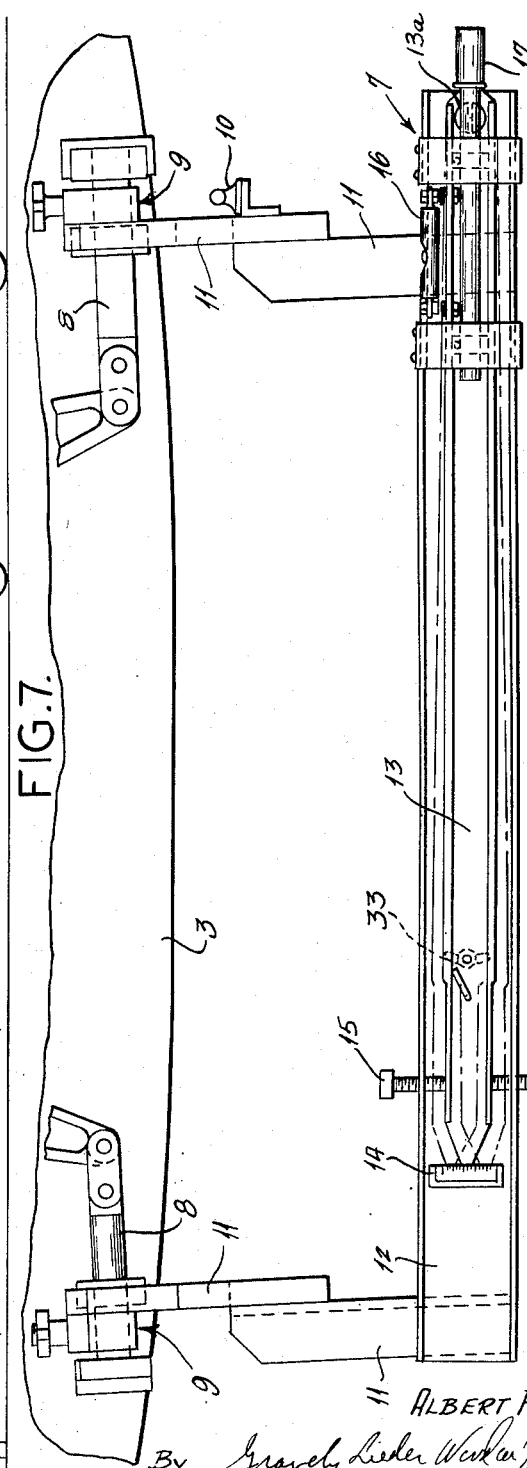
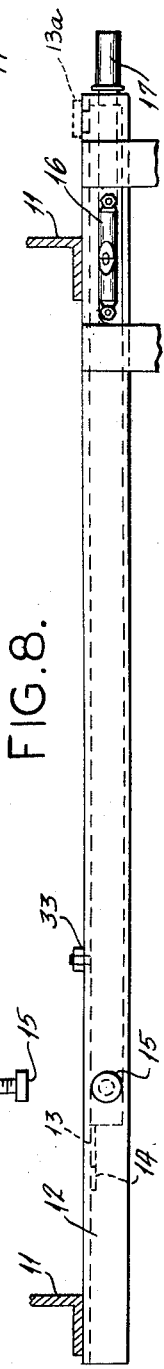
INVENTOR:
ALBERT F. HARTWIG
By Gravely Lieder, Wuerter Jr Wells
ATTORNEYS.

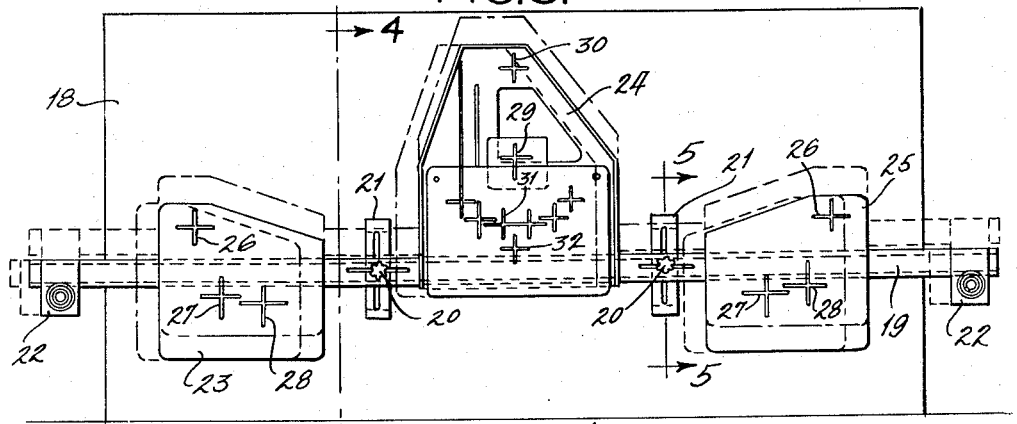
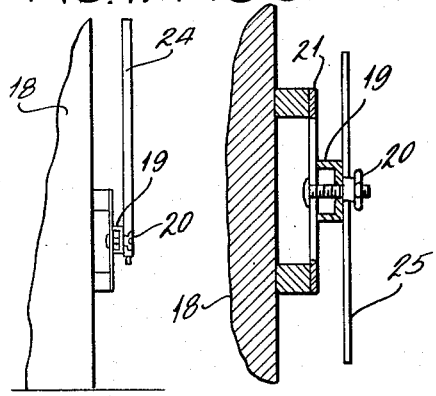
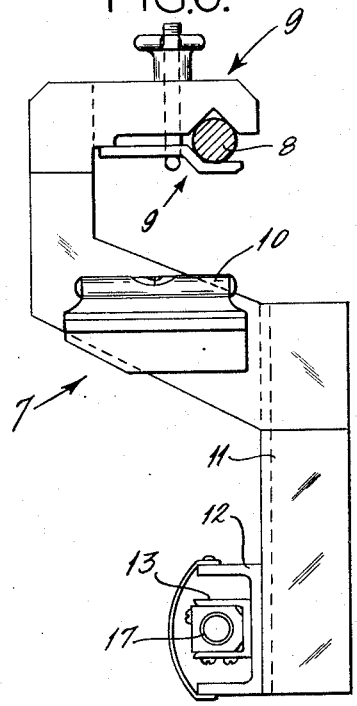

INVENTOR:
ALBERT F. HARTWIG
ATTORNEYS.

United States Patent Office 2,814,125
Patented Nov. 26, 1957

2,814,125

DEVICE AND METHOD FOR PROPER ALIGNMENT OF ARMAMENT TO FLIGHT PATH OF AIRCRAFT

Albert F. Hartwig, University City, Mo., assignor to McDonnell Aircraft Corporation, St. Louis, Mo., a corporation of Maryland Application August 8, 1952, Serial No. 303,274

8 Claims. (Cl. 33—180)

This invention relates to aircraft armament and is more particularly directed to an improved method of aligning the longitudinal axis of the armament with the true line of flight of an aircraft.

The primary object of the invention is to provide a method of armament alignment for increasing the accuracy of gun and other armament fire from an aircraft.

Another object of the invention is to provide a method of adjusting the guns in the aircraft so that the bores thereof will be correctly fixed with respect to the true line of flight of the aircraft.

A further object of the invention is to provide a combination sighting and stub-wing mean plane-determining mechanism.

The invention consists in placing an aircraft to be tested on a substantially level surface thus correctly locating the longitudinal dimension of the aircraft with respect to the surface after which the alignment of the stub-wings is measured against a reference member by means of attachments suspended from the locking pins for the foldable wings of the aircraft.

The variations in the wing stubs from the average mean plane is then measured after which these variations are averaged between the two wing stubs. A standard target is adjusted with reference to the averaged variations and by means of telescopes mounted on the attachments after which each gun and other armament holder is aligned with its reference point on the target.

In the drawings:

Fig. 1 is a side elevational view of an aircraft and target set up preparatory to test, Fig. 2 is a front elevational view of the target showing the aircraft (in dotted lines) in position, Fig. 3 is a front elevational view of the target, Fig. 4 is a sectional view taken substantially along the line 4—4 of Fig. 3, Fig. 5 is a sectional view taken substantially along the line 5—5 of Fig. 3, Fig. 6 is a front elevational view of the attachment suspended from the locking pins of the foldable aircraft wings, Fig. 7 is a side elevational view of the attachment shown in Fig. 6; and Fig. 8 is a plan view of a portion of the attachment.

The invention is disclosed in the several figures of the drawings. An aircraft to be tested designated by numeral 1 has a fuselage 2 provided with stub-wings 3 to which wing sections 4 are pivoted in the usual manner. The fuselage 2 has a longitudinal axis A which differs from the line of flight F as is determined by the wings 3 and 4. The nose of the fuselage has a plurality of guns 5 installed therein, two on each side thereof, the bores of which are to be placed in proper relationship with the true line of flight of the aircraft as indicated by the axis F. The line of flight axis is determined by the wings and the wings will have an incidence angle which should be the same for each wing, but which is not due to manufacturing tolerances, and the like. The invention aims to overcome such errors in a novel way which is simple and easy to follow.

The aircraft 1 is placed on a substantially level surface or apron and is spaced at predetermined distance from the target 6. This predetermined distance is measured from the fuselage station which is the front face of a main through bulkhead or some other suitable reference member or point on the aircraft. Since such stations differ from aircraft to aircraft, it is not necessary to indicate the station so long as it is understood. This point is regarded the reference point for positioning the aircraft the predetermined distance from the target. This distance is preferably one thousand inches.

An attachment or fixture 7 is suspended from the locking pins 8 for each of the foldable wing sections 4. The locking pin is chosen as a suitable anchor because it is fixed with respect to the stub-wings and the fuselage so that its relationship with other parts of the aircraft remains constant at all times. Since speeds of present and future day aircraft indicate that the flight path is determined by the wings, it is desirable to find the average line of incidence of the wings for the purpose of aligning armament. The attachment (Figs. 6 and 7) comprises suitable clamps 9 for securement to the locking pins 8. A suitable support is secured to one of the clamps for mounting a spirit level 10 in order to indicate when the attachment on each wing 3 is in a vertically pendent position relative to the flight attitude of the aircraft. This does not mean that the attachment 7 has been also adjusted to any particular relationship with the wing chord line or other reference. The clamps 9 each have a bar 11 thereon, and these bars are interconnected by a channel member 12 for causing the bars 11 to move together into the vertical position and to hold them in proper spaced relation. An elongated pointer 13 is pivoted at 13a to one end of the channel member 12. The pointed end of the pointer 13 cooperates with the scale 14 secured to the channel member 12 near the end thereof opposite the pivoted end thereof. Adjusting screws 15 disposed on opposite sides of the channel member cooperate with the pointer to center it on the scale or to make any other adjustment or measurement required. A spirit level 16 is secured to the pointer near the pivoted end thereof. A telescope 17 is mounted on the pointer the axis of which telescope 17 is parallel to the longitudinal axis of the pointer 13.

The pointers 13 are adjusted by screws 15 until the spirit levels 16 indicate that each of the pointers is level. The reading on the scale 14 with reference to the pointer 13 is then noted. In the event the aircraft has not been longitudinally leveled sufficiently to cause the pointer 13, when it is level, to be placed within the limits of scale 14 then further leveling of the aircraft must be done to have the pointer within the range of scale 14 before proceeding with the gun alignment operation.

The target mechanism 6 comprises a back stop 18 that supports a longitudinally extended structural member 19 adjustably secured thereto by clamp bolts 20 cooperating with longitudinal slots in the member 19 and slots in members 21, the slots therein being disposed at right angles to each other. The slots in members 19 and 21 permit the structural member 19 to be adjusted vertically and laterally. Located at each end of a structural member 19 are reference targets 22 whose spacing is the same as the telescopes 17 on attachments 7. Targets 23, 24 and 25 are secured to the structural member 19 and are suitably marked as at 26, 27 and 28 for the various pieces of armament on the aircraft. Targets 23 and 25 may be used for aligning rocket mounts, camera guns, radar equipment and various other devices. Target 24 may be marked for the various nose guns 5 and may also include a reference point for the gun sighting mechanism or any other equipment carried in the fuselage of the aircraft.

The method of employing the above described mechanism is to place the aircraft a predetermined distance from the target as explained above and a suitable tail jack (not shown) is placed under the tail structure of the aircraft for steadying the craft and also placing chock blocks on each side of the wheels. The final spacing between aircraft and target is made after the following described steps are completed to be sure this distance has not been seriously altered. The attachments are now suspended from the locking pins and adjusted until spirit levels 10 indicate they are substantially parallel to each other which will be attained when the attachments are also vertically pendent. The pointers 13 may now be adjusted with reference to the scales 14, until levels 16 are in proper location to show that they are individually level. The readings of the pointer 13 on scale 14 may be different due to twist or other factors so that the readings for each wing stub are then averaged between the two devices. Thereafter each pointer is adjusted to the average of the readings for the two wing stubs. Should the wings show a slight twist, the line of flight must be a compromise between the individual wing portions which the pilot automatically reaches for stable flight. This averages the error in the wing between the two stub-wings and indicates a sighting line which is parallel with the true line of flight or flight altitude for the wing as determined by the geometric relationship of the wing chords. The pointers are now locked in position by clamp screws 33.

If the base on which the aircraft is standing is not exactly level or if the tires of the aircraft are not uniformly inflated it is desirable to correct these conditions as well as to jack or block the aircraft so that it may be substantially leveled transversely as well as along the longitudinal axis of the fuselage before adjusting the clamps. It is not strictly essential that the base on which the aircraft stands be level but for purposes of expediting the work it is preferable that this be so.

The structural member 19 of the target mechanism 6 is now adjusted vertically and laterally so that the reference targets 22 fixed thereon are brought into alignment with the telescopes 17, the latter having been brought into proper space relationship on the aircraft as above explained. It is obvious that in addition to reference or alignment targets 22 the target mechanism 6 may include one check target with a plurality of check areas, or it may include separate check targets 23, 24 and 25, as shown. The operator adjusts the member 19 laterally and vertically until the telescope 17 on the wing-stub mounted attachments 7 and the bull's eye in the reference targets 22 are in alignment after which clamp bolts 20 are tightened to secure the structural member 19 to the back stop. Each aircraft has a given distance between reference points used for armament alignment so that, in the present example, if the attachments 7 are parallel to each other they will also be spaced the required distance to line up with the reference targets 22. This condition can be reached even though the aircraft is not exactly laterally leveled by making adjustments through the member 19.

The structural member 19 having been adjusted for bringing the reference targets 22 in alignment with the telescope 17 it is now in order to secure the check targets 23, 24, 25 to the structural member 19 in their predetermined locations so that such things as convergence of gun fire are automatically taken into account. The various reference points on each of these check targets denote the positioning and spacing of each gun, rocket mount, or other device on the aircraft. A standard boresighting instrument is now inserted in the muzzle of each gun and the barrel thereof tilted or adjusted until it is brought into alignment with its particular check target reference point. The same procedure is employed for all the other gun or rocket equipment. Thereafter, the sighting device in the aircraft is aligned with its check target reference point. The check target 24 may now be removed and replaced with a paper practice target and several rounds of ammunition are fired for the purpose of testing the accuracy of the adjustment. Final adjustments if necessary are then made for each gun and the other armament devices may be tested for accuracy in a similar manner if so desired. The method of gun alignment described above as well as for other armament aligns them with the true line of flight, of course due allowance being made for the desirability of convergence of the fire power of the craft. When aircraft is flying at slower speeds, the shape of the fuselage has a directional effect which may determine or have an effect on the true line of flight of the aircraft and when flight rates approach sonic speeds or greater, the influence of the fuselage in determining true line of flight decreases and the set or incidence (angle of attack) of the wings increasingly determines the true line of flight. When the stub-wings 3 are correctly aligned with each other, little or no effect is produced on the designed line of flight but when the stub-wings are not correctly aligned but possess possible wing twist, warp and the like the line of flight at high speeds will vary from the designed line. Thus the longitudinal axis A (Fig. 1) of the fuselage may not be relied upon for accurate results. By measuring the error or variation between the wing stubs and averaging the error between the stub-wings, the true line of flight may be approximately determined and armament correctly related with respect to this true line of flight so that the net effect is to increase the accuracy of gun fire and decrease the number of times the target is missed.

The mechanism described above may be employed for installing and aligning compasses, bank and turn indicators, radar equipment and various other instruments. The procedure for aligning these instruments is varied from that described above in that the structural member 19 mounting the reference and check targets must first be placed in a level position and then secured. It is understood that the aircraft is still located the same given distance from the target mechanism as described above. The attachments 7 are suspended from the locking pins 8 and adjusted until the spirit level 10 indicates a level condition which places the device parallel to each other. The twist, if any, or relative geometric position between the stub-wings 4 and the fuselage is now determined and the pointer 13 adjusted on each fixture so that the zero scale reading becomes the means position thereof. The entire aircraft must now be leveled by adjusting the tail jack as well as regulating tire inflation or jacks under the stub-wings or other parts of the aircraft until the wing chords are level or horizontal. The telescopes 17 are then brought into focus on reference targets 22 while maintaining spirit levels 10 at a level reading, thus indicating that the entire aircraft is in a level condition. Having brought telescopes 17 into alignment with the reference targets by adjusting the horizontal plane of these targets, the instruments are now adjusted to their proper position by relating them to suitable reference points mounted on the structural member 19 or adjusting the indicator thereof to zero position thus properly relating each of the instruments to the true line of flight of the aircraft.

Where line of flight is used herein it is understood to mean the flight path of the wing which is coincident with or at some known angle to the chord line for the airfoil section used in the wing when the aircraft is considered to be in normal level flight at a predetermined speed. With this as a critical reference condition it may be seen that the locking pins 8 can be installed parallel to the wing chord line for the portion of the wing in which they are mounted. Where misalignment or structural misalignment is used in the description and claims it is understood to refer to the usual errors in construction of aircraft which result in wing twist and other deviations from the theoretically perfectly constructed aircraft which will have coincidental theoretical and actual lines of flight.

What I claim is:

1. The method of aligning armament alignment check targets for aircraft with respect to the true line of flight of the aircraft comprising mounting a measuring instrument on each wing of the aircraft, adjusting the instruments to determine the amount of structural misalignment of each wing of the aircraft with respect to a reference axis of the wing, averaging the amount of misalignment between the wings to determine further adjustment of the instruments, readjusting the instruments to average out the misalignment between the wing, providing an armament alignment check target with target means to determine the location of the check target relative to the aircraft, and locating the target means with the readjusted measuring instruments.

2. The method of aligning armament alignment check targets for aircraft with respect to the true line of flight of the aircraft comprising mounting measuring instruments on the aircraft wings for determining the amount of misalignment between the wings on the opposite side of the aircraft with respect to the chord line of the wings, averaging the amount of misalignment of each wing, readjusting the instruments for the purpose of applying the average of the misalignment to the measuring instruments, and providing and locating an armament check target with the readjusted measuring instruments, the target having a plurality of instrument sighted reference target portions thereon.

3. The method of aligning armament mounted in the respective wings of aircraft with check targets bearing a relation to each other determined by the line of flight of the aircraft comprising placing the aircraft on a substantially level ground reference surface, placing a measuring instrument on each wing for determining the amount of structural misalignment of the wings of the aircraft with respect to the line of flight of the aircraft, averaging the structural misalignment of the wings to find a mean position of readjustment for the instruments; readjusting the instruments for the purpose of applying the average thereof to each of the measuring instruments placed on each wing, providing a check target having alignment targets thereon, and aligning the alignment targets on the check target with the instruments to determine the position of the check target relative to the aircraft.

4. A mechanism for aligning aircraft armament and measuring aircraft wing misalignment comprising a target alignable with the aircraft, an attachment suspendable from each of the aircraft wings, a level on each attachment for indicating when said attachment is located in a vertical plane, said attachments being thereby brought into a predetermined spaced apart relation, a wing chord pointer device in each said attachment, level and scale means in each said attachment cooperating with said pointer, said level being set to read horizontal conditions of said pointer device for measuring the amount of misalignment of the wing chord from the horizontal, and a target sighting device carried by each said pointer, all of said pointers being adjustable to a position representative of the mean deflection of wing chord from the horizontal to locate said target sighting devices in position to determine the alignment of said target.

5. A mechanism for aligning aircraft armament and measuring aircraft wing misalignment comprising a preset target alignable with the aircraft, an attachment securable to the wing at each side of the aircraft, means on each of said attachments for indicating when it is disposed in a vertical plane, said attachments being spaced a predetermined distance apart when in vertical planes, a pointer pivoted in each of said attachments, a measuring scale cooperating with each of said pointers, means on each of said pointers for indicating when said pointer is in level position to thereby measure the angular relation of the wing chord with respect to the horizontal, and a sighting device on each of said pointers for aligning the target with the aircraft.

6. An aircraft target aligning method comprising placing a reference target in a generally horizontal plane with the aircraft, suspending target aligning devices from the aircraft wings, each of said devices including an angularly adjustable pointer and a relatively fixed scale, placing the devices in fixed spaced relation in generally vertical parallel planes, measuring the twist between the wings on the opposite sides of the aircraft with respect to horizontal plane, adjusting each of the target aligning devices with its pointer located by said scale at an average reading of the total twist of the wings, and finally aligning the target with the adjusted pointers.

7. An aircraft armament aligning method comprising placing the aircraft on a substantially level surface with the wing substantially laterally levelled and longitudinally substantially in the true line of the flight, placing a target a predetermined distance from the aircraft, averaging the error in the wing structural misalignment for determining the substantially true line of flight of the aircraft wing, sighting along the resulting true line of flight and aligning the target therewith; and then providing check targets for aligning each piece of armament on the aircraft with its particular check target.

8. An aircraft armament aligning method comprising placing the aircraft on a substantially level surface, then applying a structural misalignment measuring device to each of the wings for measuring deviations of the wing chord from the theoretical line of flight to find the true line of flight as fixed by the misalignment of the wings, averaging the error of the aircraft wings alignment for determining the true line of flight of the aircraft in relation to the wing chord and applying the average error measurement to each measuring device, then aligning a target having armament check targets thereon, with the measuring device; and then aligning each piece of armament with its check target.

References Cited in the file of this patent

UNITED STATES PATENTS

| 936,570 | Saxe | Oct. 12, 1909 |
| 1,309,429 | Stephens | July 8, 1919 |
| 1,743,546 | Hill | Jan. 14, 1930 |
| 1,838,226 | Jenkins | Dec. 29, 1931 |
| 1,985,393 | Zwiercan | Dec. 25, 1934 |
| 2,127,734 | Hill | Aug. 23, 1938 |
| 2,144,838 | Falge | Jan. 24, 1939 |
| 2,167,803 | Graham et al. | Aug. 1, 1939 |
| 2,249,226 | Peters | July 15, 1941 |
| 2,292,968 | Peters | Aug. 11, 1942 |
| 2,353,272 | Simmons et al. | July 11, 1944 |
| 2,381,010 | Spigelsky | Aug. 7, 1945 |
| 2,464,485 | Burroughs | Mar. 15, 1949 |
| 2,497,861 | Brown | Feb. 21, 1950 |
| 2,516,435 | Trimbach | July 25, 1950 |
| 2,598,794 | Holmes | June 3, 1952 |
| 2,691,824 | Stooksberry | Oct. 19, 1954 |